May 26, 1970  R. A. MENDELOW  3,513,981
ROTARY GATE, MULTIPORT VALVE FOR DIRECT
MOUNTING ON A FILTER TANK
Filed Feb. 6, 1968  4 Sheets-Sheet 1
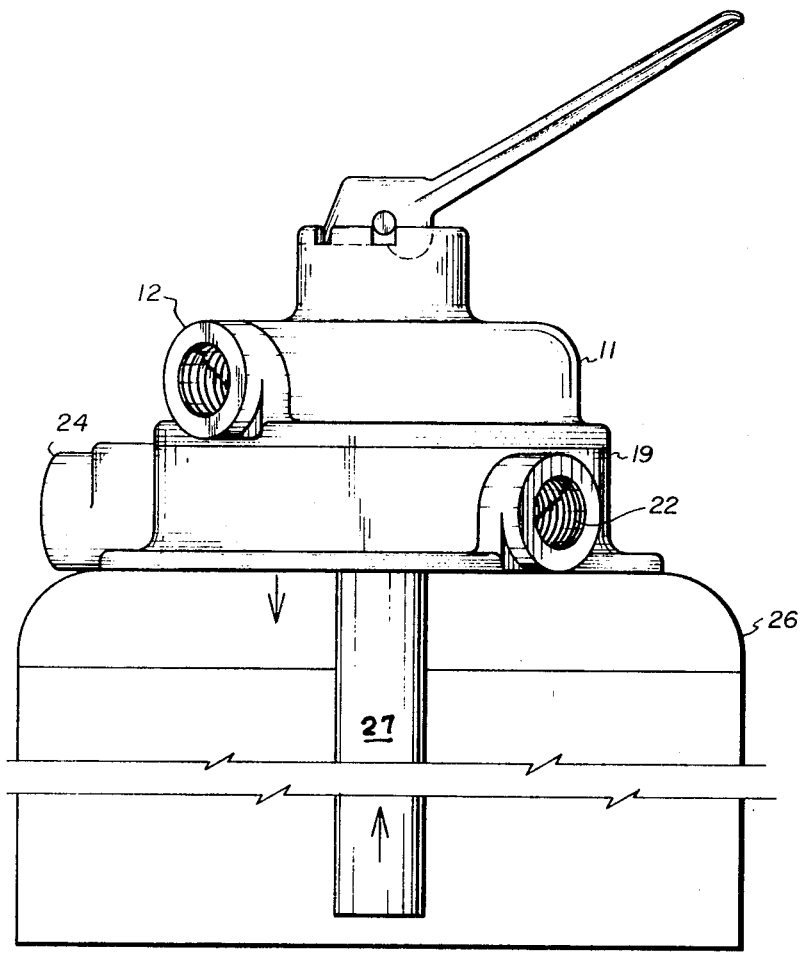
FIG. 1
FIG. 2
INVENTOR.
ROBERT A. MENDELOW
BY 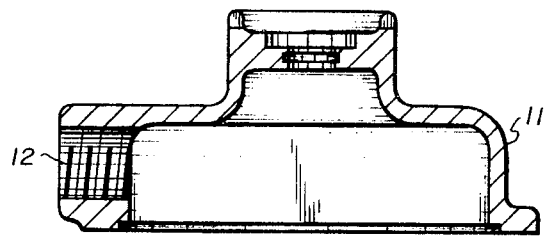
ATTORNEYS

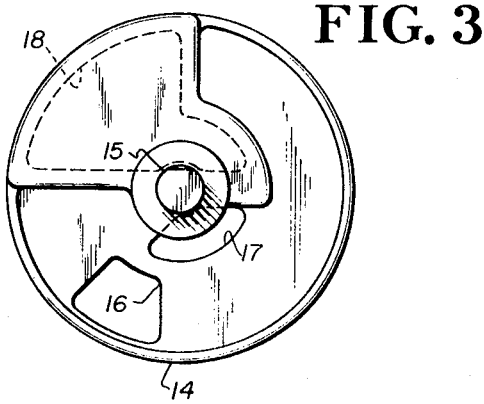
FIG. 3
FIG. 4
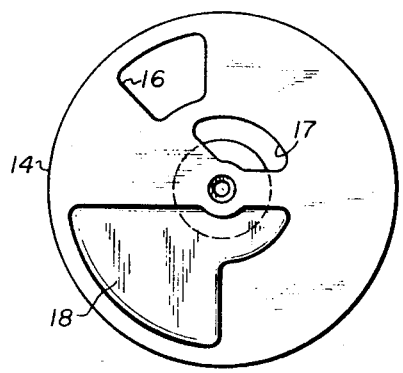
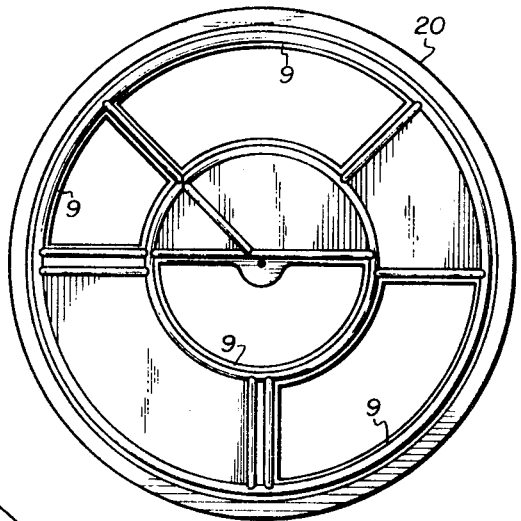
FIG. 5
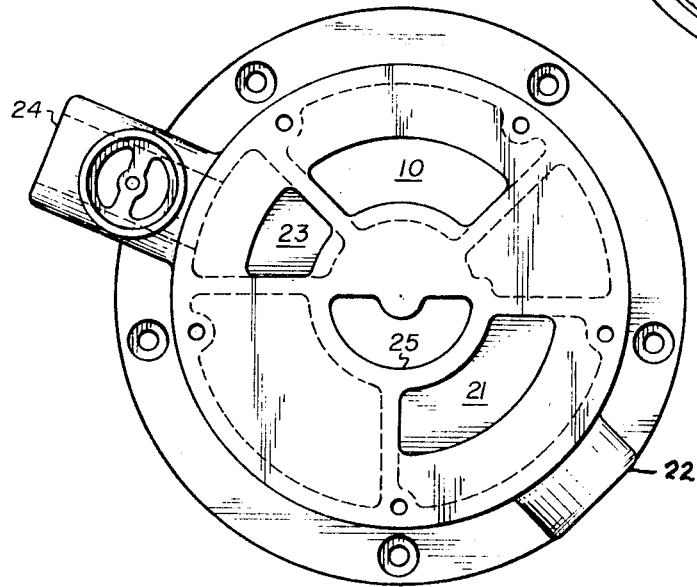
FIG. 6
INVENTOR.
ROBERT A. MENDELOW

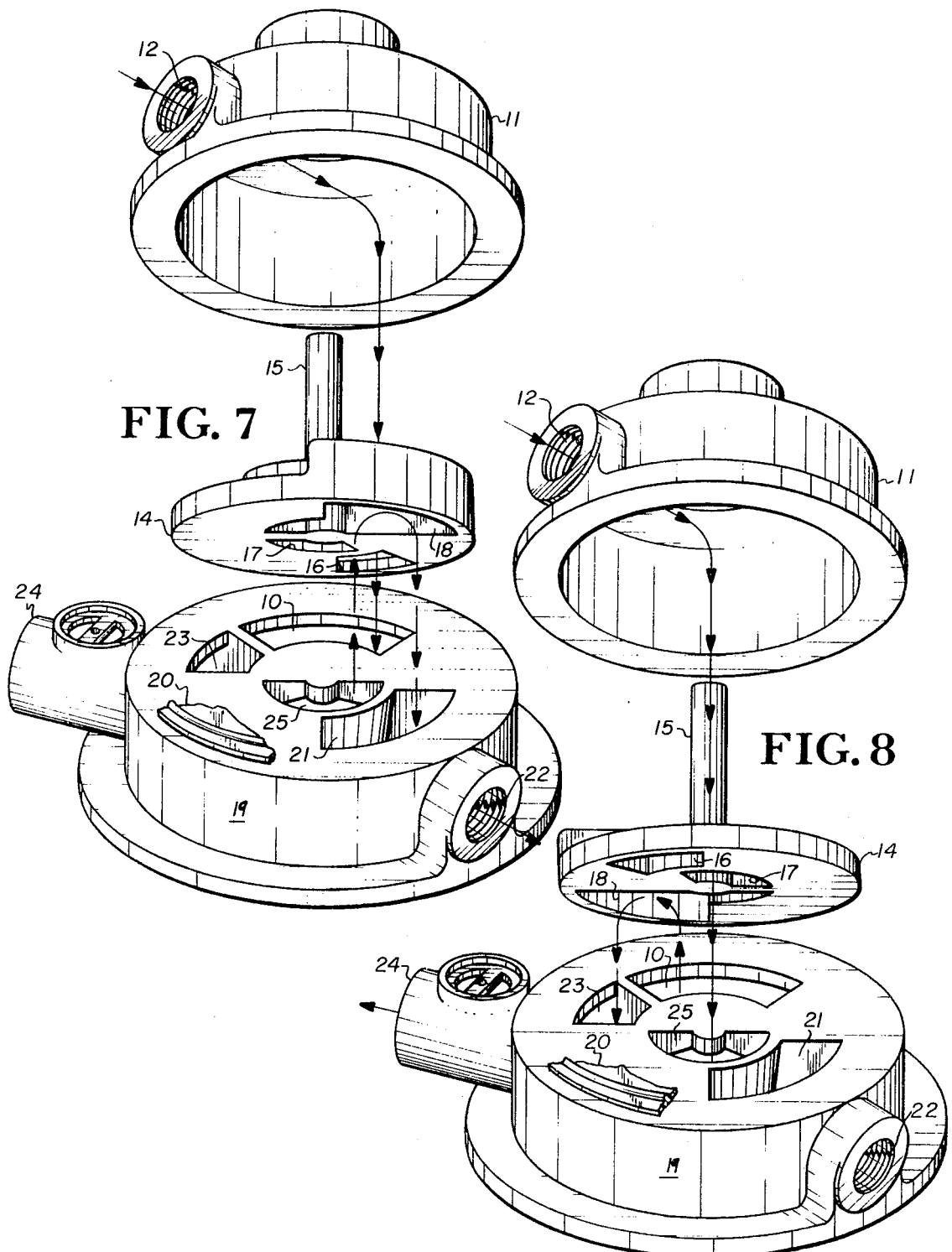

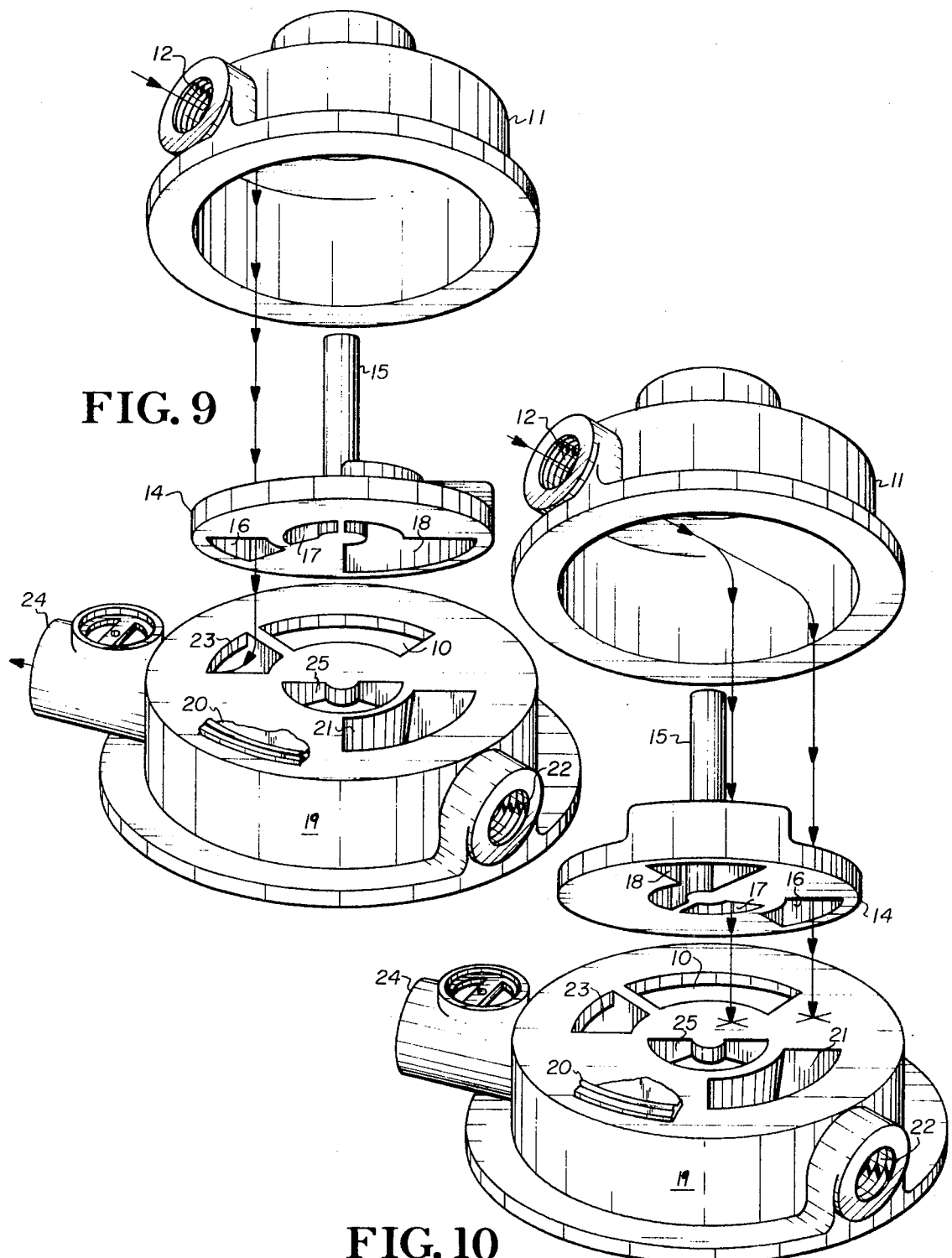

United States Patent Office

3,513,981
Patented May 26, 1970

3,513,981
ROTARY GATE, MULTIPORT VALVE FOR DIRECT MOUNTING ON A FILTER TANK
Robert A. Mendelow, Flushing, N.Y., assignor to Major Pool Equipment Corporation, South Kearney, N.J., a corporation of New Jersey
Filed Feb. 6, 1968, Ser. No. 703,439
Int. Cl. B01d 29/38
U.S. Cl. 210—411                9 Claims

ABSTRACT OF THE DISCLOSURE

A rotary gate, multiport valve having a filter position, a backwash position, a waste position, and a closed position, with a rotary gate controlling these positions by reason of the positioning of an axial port, a peripheral port, and a bypass arranged to cooperate with a plurality of chambers in the valve body and with the valve cap.

---

Multiport valves of considerable complexity in design are known, they being designed to perform numerous functions by simple adjustment of the valve. In order that they may perform numerous functions, the design of the valve is frequently complex, the adjustment of the valve is difficult, pressure drop across the valve is high, and often there is leakage. Moreover, such valves are usually external to and require separate conduits to and from a filter.

It has been found that a rotary gate, multiport valve can be designed for direct mounting on a filter, so that no external conduits from the valve to the filter are required. It has also been found that such a valve may have a vastly simplified construction. It has been found that such a valve may be supplied with a single generally flat gasket whereby leakage is avoided, the valve is easy to operate and change from position to position, and the life of the valve and freedom from leakage is drastically extended. All of this is accomplished with a minimal pressure drop due to the unique design.

These objects and advantages as well as other objects and advantages may be attained by the rotary gate, multiport valve shown by way of illustration in the drawings in which:

FIG. 1 is a side elevational view of the valve mounted on a filter;

FIG. 2 is a vertical sectional view of the cap of the valve;

FIG. 3 is a top plan view of the rotary gate;

FIG. 4 is a bottom plan view of the rotary gate;

FIG. 5 is a top plan view of the gasket;

FIG. 6 is a top plan view of the valve body;

FIG. 7 is an exploded view of the valve positioned for filter action;

FIG. 8 is an exploded view of the valve positioned for purging the filter;

FIG. 9 is an exploded view of the valve positioned for pump out or waste;

FIG. 10 is a view of the valve in closed position.

Referring now to the drawings in detail, the rotary gate, multiport valve for direct mounting on a filter tank is provided with a bonnet or cap 11. The cap 11 is a generally dome-shaped member having an intake conduit 12 designed to receive pumpage. The bottom of the bonnet 11 is provided with an annular opening 13 to receive a rotary gate 14. The rotary gate is provided with a central axial shaft 15 by which it may be adjusted. The shaft 15 extends through an axial passage in the bonnet 11 so that a control lever can be attached to the outer end of the shaft 15, thereby permitting the adjustment of the rotary gate 14 to various chosen positions. The rotary gate 14 is provided with a peripheral slot 16 in the form of a truncated sector. The peripheral slot 16 is positioned in the rotary gate 14 so that it may be brought into registration with each of three peripheral chambers that will hereinafter be referred to; the registration of the peripheral slot 16 is accomplished by rotating the rotary gate 14 so that the slot 16 will be in general registration with each of the peripheral chambers successively as the rotary gate 14 is rotated. In addition to the peripheral slot 16, the rotary gate is provided with a generally axial slot 17. The axial slot 17 is positioned on the rotary gate 14 so that it may be brought into general registration with an axial chamber that will hereinafter be referred to. The rotary gate 14 is also provided with an elongated bypass 18 extending from the periphery of the rotary gate 14 inwardly to the axial area of the rotary gate 14. The bypass 18 is not an open slot but an enclosed slot having a continuous domed web formed integrally with the rotary gate 14. As has been indicated, the rotary gate 14 is positioned in the opening 13 so that the bypass clears the bonnet 11, and the rotary gate can be rotated 360° within the bonnet. The bonnet 11 is attached to a body 19 which constitutes the base of the valve. The rotary gate is positioned on the top of the body 19 and rotates thereon. Intervening between the bonnet or cap 11 and the body 19, there is a gasket 20 having a plurality of apertures in registration with the chambers in the body that will now be referred to. The apertures are provided with marginal ridges 9 to insure complete sealing and freedom from leakage.

The rotary gate 14 seals with raised portions of the gasket 20 surrounding the apertures, preventing leakage between the various chambers and slots. There is a first peripheral chamber 10 which extends from the top of the body to the bottom of the body, where it is connected to a filter chamber. There is a second peripheral chamber 21 which is open to the top of the body and communicates with a return port 22. There is a third peripheral chamber 23 which is open to the top of the body 19 and communicates with a waste port 24. There is also an axial chamber 25 which communicates from the top of the body to the bottom of the body, where it is connected to a filter 26. A conduit 27 communicates with the axial chamber 25 and the bottom of the filter 26.

It will be seen that the rotary gate may be adjusted to four different positions. With the rotary gate 14 adjusted to a position in which the peripheral slot 16 is in registration with the first peripheral chamber 10, the bypass 18 will be in communication between the axial chamber 25 and the second peripheral chamber 21. In this position, a filtration course for pumpage is defined in that fluid from the pump passes through the peripheral slot 16 into the first peripheral chamber 10, which communicates directly with the filter chamber. The conduit 27 returns the filtered fluid into the axial chamber 25 in the body 19, whereby it traverses the bypass 18 into the second peripheral chamber 21 and out the return port 22.

When a filtration course is no longer desired, and it is required that the filter be purged by a backwash, the rotary gate 14 is reoriented so that the axial slot 17, is arranged in registration with the axial chamber 25 in the body 19. At the same time, the bypass 18 communicates between the first peripheral chamber 10 and the third peripheral chamber 23. It will be seen that a backwash course through the filter is defined thereby for the pumpage enters the conduit 12 into the cap 11, passing through the axial slot 17 in the rotary gate 14 and entering the axial chamber 25. It passes through the axial chamber 25 down through the conduit 27 into the bottom of the filter 26. The reverse flow passes up through the filter 26 and out the top of the filter 26 into the first peripheral chamber 10. From the first peripheral chamber 10, the backwash proceeds into the bypass 18 into the third peripheral chamber 23 and out the waste port 24. It will be noted that in this position of the rotary gate 14, the peripheral slot 16 is obstructed by the top surface of the body 19, and the gasket 20.

When the backwash is complete and the filter purged, the user of the multiport valve may desire to return to the filtration course first described. On the other hand, it may be desired to discharge the contents of the pool or other source of fluid. A waste course is then available. The rotary gate 14 is adjusted so that the peripheral slot 16 is disposed in registration with the third peripheral chamber 23. It will be seen that the pumpage passes through the conduit 12 into the cap 11; thence through the peripheral slot 16 in the rotary gate 14; thence through the third peripheral chamber 23 and out of the waste port 24. In this position, access to the axial chamber 25 through the axial slot 17 is available to the pumpage entering into the bonnet or cap 11, but since the first peripheral chamber 10 is obstructed by the rotary gate, there is no flow through the filter 26.

If the valve is to be completely closed so that there is no flow whatsoever, the gate 14 is rotated to the next position wherein the peripheral slot 16 and the axial slot 17 are disposed against the top surface of the body 19 (and the gasket 20) between the second peripheral chamber 21 and the first peripheral chamber 10. Since these slots are not in registration with either of these chambers or the axial chamber, a closed position is defined and there is no flow through the valve. An adjustment lever is applied to the top of the shaft 15 where it extends through the bonnet 11 so that the rotary gate 14 may be adjusted to any of the chosen positions.

The gasket 20 serves as a seal between the rotary gate 14 and the top of the body 19 so that no fluid in any part of the valve may escape from any chamber to any adjacent chamber except through the openings in the gasket 20.

This construction provides a multiport valve that may be adjusted to select, at will, any of four separate functions. It is easy to operate, free from leaks, and durable. The gasket 20 has a vastly extended life. The valve is relatively inexpensive to construct, install and maintain. Most notable is the fact of free and direct access of pumpage through the valve, which accounts for the very low pressure drop.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. A rotary gate, multiport valve mounted directly on a filter comprising,
   (a) a bonnet having a pumpage input conduit,
   (b) a body to which the bonnet is attached defining a pumpage output port,
   (c) a rotary gate in the bonnet controlling the passage of pumpage from the bonnet to the body,
   (d) first, second third peripheral chambers, and an axial chamber in the body opposite to the bonnet,
   (e) the first chamber communicating with the top of the filter,
   (f) the second chamber communicating with a return port in the body,
   (g) the third chamber communicating with a waste port in the body,
   (h) the axial chamber communicating with a conduit extending toward the bottom of the filter,
   (i) a peripheral slot, an axial slot, and a by-pass in the rotary gate,
   (j) the peripheral slot, the axial slot, and the by-pass in the rotary gate co-operatively adjustable in registration successively with the first chamber, the second chamber, the third chamber, and the axial chamber to define a filter course, a backwash course, a waste course, and a closed position.

2. The device according to claim 1 and,
   (a) the peripheral slot positionable in registration with the first peripheral chamber, the axial chamber positionable simultaneously in registration with the by-pass, and the by-pass also simultaneously in registration with the second peripheral chamber to define a filter course,
   (b) the axial slot positionable in registration with the axial chamber, the first peripheral chamber positionable simultaneously in registration with the by-pass, and the by-pass also in registration with the third peripheral chamber to define a backwash course,
   (c) the peripheral slot positionable in registration with the third peripheral chamber to define a waste course,
   (d) the peripheral and axial slots positionable out of registration with the chambers in the body, and opposite the top of the body, to define a closed position.

3. The device according to claim 1 and,
   (a) generally flat gasket disposed between the rotary gate and the body, with openings in registration with the first, second, third and axial chambers.

4. The device according to claim 1 and,
   (a) a generally flat gasket disposed between the rotary gate and the body, with openings in registration with the first, second, third and axial chambers,
   (b) a continuous rib surrounding each opening in the gasket.

5. The device according to claim 1 in which the peripheral slot is positionable in registration with the first peripheral chamber, the axial chamber is positionable simultaneously in registration with the by-pass, and the by-pass also simultaneously in registration with the second peripheral chamber to define a filter course.

6. The device according to claim 1 in which the axial slot is positionable in registration with the axial chamber, the first peripheral chamber is positionable simultaneously in registration with the by-pass, and the by-pass also is in registration with the third peripheral chamber to define a backwash course.

7. The device according to claim 1 in which the peripheral slot is positionable in registration with the third peripheral chamber to define a waste course.

8. The device according to claim 1 in which the peripheral and axial slots are positionable out of registration with the chambers in the body, and opposite the top of the body, to define a closed position.

9. A rotary gate, a multiport valve comprising,
   (a) a bonnet having a pumpage input conduit,
   (b) the bonnet attached to a body having a pumpage output discharge port,
   (c) a rotary gate in the bonnet controlling the passage from the bonnet to the body,
   (d) first, second, third peripheral chambers, and an axial chamber in the body opposite to the bonnet,
   (e) the first chamber communicating with the top of a filter,
   (f) the second chamber communicating with a return port in the body,
   (g) the third chamber communicating with a waste port in the body,
   (h) the axial chamber communicating with a conduit extending toward the bottom of the filter,
   (i) a peripheral slot, an axial slot, and a by-pass in the rotary gate,
   (j) the peripheral slot, the axial slot, and the by-pass in the rotary gate co-operatively adjustable in registration with the first chamber, the second chamber, and the third chamber, and the axial chamber to define a filter course, a backwash course, a waste course, and a closed position, (k) the peripheral slot positionable in registration with the first peripheral chamber, the axial chamber positionable simultaneously in registration with the by-pass, and the by-pass also simultaneously in registration with the second peripheral chamber to define a filter course, (l) the axial slot positionable in registration with the axial chamber, the first peripheral chamber positionable simultaneously in registration with the by-pass, and the by-pass also in registration with the third peripheral chamber to define a backwash course, (m) the peripheral slot positionable in registration with the third peripheral chamber to define a waste course, (n) the peripheral and axial slots positionable out of registration with the chambers in the body, and opposite the top of the body, to define a closed position.

References Cited

UNITED STATES PATENTS

| | | | |
|---|---|---|---|
| Re. 24,055 | 8/1955 | Daniels | 137—625.46 X |
| 550,939 | 12/1895 | Blessing | 210—411 X |
| 3,185,176 | 5/1965 | Webb | 137—625.17 |
| 3,258,920 | 7/1966 | Hott et al. | 137—625.46 X |
| 3,385,321 | 5/1968 | Ehrens et al. | 137—625.46 |

JOHN W. ADEE, Primary Examiner

U.S. Cl. X.R.

137—625.15, 625.18; 210—425, 429